(12) United States Patent
Yasui et al.

(10) Patent No.: US 9,891,498 B2
(45) Date of Patent: *Feb. 13, 2018

(54) ELECTROPHORETIC DEVICE, DISPLAY UNIT, AND ELECTRONIC APPARATUS

(71) Applicant: SONY CORPORATION, Tokyo (JP)

(72) Inventors: Atsuhito Yasui, Kanagawa (JP); Hidehiko Takanashi, Kanagawa (JP); Ken Kobayashi, Kanagawa (JP); Yuriko Kaino, Kanagawa (JP); Masakazu Mitsugi, Kanagawa (JP); Aya Shuto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,924

(22) Filed: Nov. 30, 2015

(65) Prior Publication Data
US 2016/0091771 A1 Mar. 31, 2016

Related U.S. Application Data

(63) Continuation of application No. 14/085,445, filed on Nov. 20, 2013, now Pat. No. 9,201,284.

(30) Foreign Application Priority Data

Nov. 27, 2012 (JP) ................................. 2012-258544

(51) Int. Cl.
| | |
|---|---|
| G02B 26/00 | (2006.01) |
| G02F 1/133 | (2006.01) |
| G09G 3/19 | (2006.01) |
| G03G 13/00 | (2006.01) |
| G02F 1/167 | (2006.01) |

(52) U.S. Cl.
CPC ........ *G02F 1/167* (2013.01); *G02F 2001/1672* (2013.01); *G02F 2001/1678* (2013.01)

(58) Field of Classification Search
CPC ................... G02F 1/0123; G02F 1/167; G02F 2001/1678; G02F 1/172; G02F 2001/1672; G02F 1/07; G02B 26/026; G02B 26/001
USPC ........ 359/296, 253–254, 245, 290–291, 298; 349/33; 345/49, 105, 107; 430/31–32
See application file for complete search history.

(56) References Cited

U.S. PATENT DOCUMENTS

| | | | | |
|---|---|---|---|---|
| 2001/0041339 | A1* | 11/2001 | Anderson | B01J 19/0046 435/6.11 |
| 2008/0112040 | A1* | 5/2008 | Suwabe | G02F 1/167 359/296 |
| 2008/0151355 | A1* | 6/2008 | Suwabe | G02F 1/167 359/296 |
| 2011/0075249 | A1* | 3/2011 | Murakami | G02F 1/167 359/296 |
| 2012/0200910 | A1* | 8/2012 | Hayashi | G02F 1/167 359/296 |

* cited by examiner

*Primary Examiner* — Dawayne A Pinkney
(74) *Attorney, Agent, or Firm* — Chip Law Group

(57) ABSTRACT

An electrophoretic device includes: a porous layer including a first fibrous structure and a non-electrophoretic particle held in the first fibrous structure; an electrophoretic particle configured to move through a space formed at the porous layer; a second fibrous structure covering the porous layer; and a partition provided from the porous layer to the second fibrous structure.

14 Claims, 14 Drawing Sheets

ELECTROPHORETIC DEVICE, DISPLAY UNIT, AND ELECTRONIC APPARATUS

CROSS REFERENCE TO RELATED APPLICATIONS

The present application is a continuation of U.S. patent application Ser. No. 14/085,445 filed on Nov. 20, 2013 which claims priority of the Japanese Patent Application No. JP2012-258544 filed on Nov. 27, 2012 in the Japan Patent Office, the entire contents of which are incorporated herein by reference.

BACKGROUND

The present technology relates to an electrophoretic device including an electrophoretic particle in an insulating liquid. The present technology also relates to a display unit using the electrophoretic device, and an electronic apparatus provided with the display unit.

In recent years, low-power display units (displays) with high image quality have been in increasing demand, as mobile equipment such as mobile phones and portable information terminals has become widespread. In particular, recently, electronic book delivery businesses have begun, and a display having display quality suitable for reading purpose has been desired.

As such a display, displays such as a cholesteric liquid crystal display, an electrophoretic display, an electric-redox-type display, and a twisting ball display have been proposed. For reading purpose, reflection-type displays are advantageous. In the reflection-type displays, bright display is performed using reflection (diffusion) of external light in a manner similar to paper and thus, display quality close to that of paper is achieved.

Among the reflection-type displays, an electrophoretic display utilizing an electrophoretic phenomenon has a high response speed while consuming low power, and thus is expected as a strong candidate. As a display method thereof, mainly the following two methods have been proposed.

A first method is a method in which two kinds of charged particles are dispersed in an insulating liquid, and the charged particles are moved in response to an electric field. These two kinds of charged particles are different from each other in terms of optical reflection property, and are also of opposite polarity. In this method, an image is displayed by changing of distribution of the charged particles in response to an electric field.

A second method is a method in which charged particles are dispersed in an insulating liquid, and a porous layer is disposed (for example, see Japanese Unexamined Patent Application Publication No. 2012-22296). In this method, the charged particles are moved through pores of the porous layer in response to an electric field. For example, a polymeric film may be used for the porous layer.

SUMMARY

Although various display methods such as those described above have been proposed for the electrophoretic display, the display quality thereof is still insufficient, and a further improvement in contrast is expected.

It is desirable to provide an electrophoretic device, a display unit, and an electronic apparatus that are of high contrast.

According to an embodiment (1) of the present technology, there is provided an electrophoretic device including: a porous layer including a first fibrous structure and a non-electrophoretic particle held in the first fibrous structure; an electrophoretic particle configured to move through a space formed at the porous layer; a second fibrous structure covering the porous layer; and a partition provided from the porous layer to the second fibrous structure.

According to an embodiment (2) of the present technology, there is provided an electrophoretic device including: a porous layer including a fibrous structure and a non-electrophoretic particle held in the fibrous structure; an electrophoretic particle configured to move through a space formed at the porous layer; and a partition provided from inside of the porous layer to outside of the porous layer. A width of a part of the partition, the part being on the outside of the porous layer, is smaller than a width of a part of the partition in the porous layer, the part being closest to the outside.

According to an embodiment (3) of the present technology, there is provided a display unit provided with an electrophoretic device. The electrophoretic device includes: a porous layer including a first fibrous structure and a non-electrophoretic particle held in the first fibrous structure; an electrophoretic particle configured to move through a space formed at the porous layer, a second fibrous structure covering the porous layer, and a partition provided from the porous layer to the second fibrous structure.

According to an embodiment (4) of the present technology, there is provided a display unit provided with an electrophoretic device. The electrophoretic device includes: a porous layer including a fibrous structure and a non-electrophoretic particle held in the fibrous structure, an electrophoretic particle configured to move through a space formed at the porous layer; and a partition provided from inside of the porous layer to outside of the porous layer. A width of a part of the partition, the part being on the outside of the porous layer, is smaller than a width of a part of the partition in the porous layer, the part being closest to the outside.

According to an embodiment (5) of the present technology, there is provided an electronic apparatus with a display unit. The display unit is provided with an electrophoretic device. The electrophoretic device includes: a porous layer including a first fibrous structure and a non-electrophoretic particle held in the first fibrous structure; an electrophoretic particle configured to move through a space formed at the porous layer, a second fibrous structure covering the porous layer, and a partition provided from the porous layer to the second fibrous structure.

According to an embodiment (6) of the present technology, there is provided an electronic apparatus with a display unit. The display unit is provided with an electrophoretic device. The electrophoretic device includes: a porous layer including a fibrous structure and a non-electrophoretic particle held in the fibrous structure; an electrophoretic particle configured to move through a space formed at the porous layer, and a partition provided from inside of the porous layer to outside of the porous layer. A width of a part of the partition, the part being on the outside of the porous layer, is smaller than a width of a part of the partition in the porous layer, the part being closest to the outside.

In the electrophoretic device according to the embodiment (1) of the present technology, the porous layer including the non-electrophoretic particle is covered with the second fibrous structure. Therefore, light applied to a surface (a surface on the second fibrous structure side) is prevented from being affected by the non-electrophoretic particle. This allows, for example, a width of the partition in the second fibrous structure to be smaller than a width in the porous layer, when the partition is formed using a photocurable resin. In the electrophoretic device according to the embodiment (2) of the present technology, a width of the part of the partition, the part being on the outside of the porous layer, is made smaller than a width thereof in the porous layer. Therefore, a region between the adjacent partitions is widened on the surface side (on the outside of the porous layer). In other words, a region in which the electrophoretic particle is freely movable becomes large.

According to the electrophoretic device, display unit, and electronic apparatus of the above-described embodiments (1), (3), and (5) of the present technology, the porous layer is covered with the second fibrous structure. According to the electrophoretic device, display unit, and electronic apparatus of the above-described embodiments (2), (4), and (6) of the present technology, the width of the part of the partition, the part being on the outside of the porous layer, is smaller than the width in the porous layer. Therefore, a region in which optical characteristics change due to electrophoresis is allowed to be large. Accordingly, it is possible to improve contrast of a displayed image.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the present disclosure, and are incorporated in and configure a part of this specification. The drawings illustrate embodiments and, together with the specification, serve to describe the principles of the technology.

DETAILED DESCRIPTION

An embodiment of the present technology will be described below in detail with reference to the drawings. It is to be noted that the description will be provided in the following order.
1. Embodiment (a display unit: an example that includes an electrophoretic device including a second fibrous structure)
2. Application Examples
3. Example

Embodiment

Figure 1:
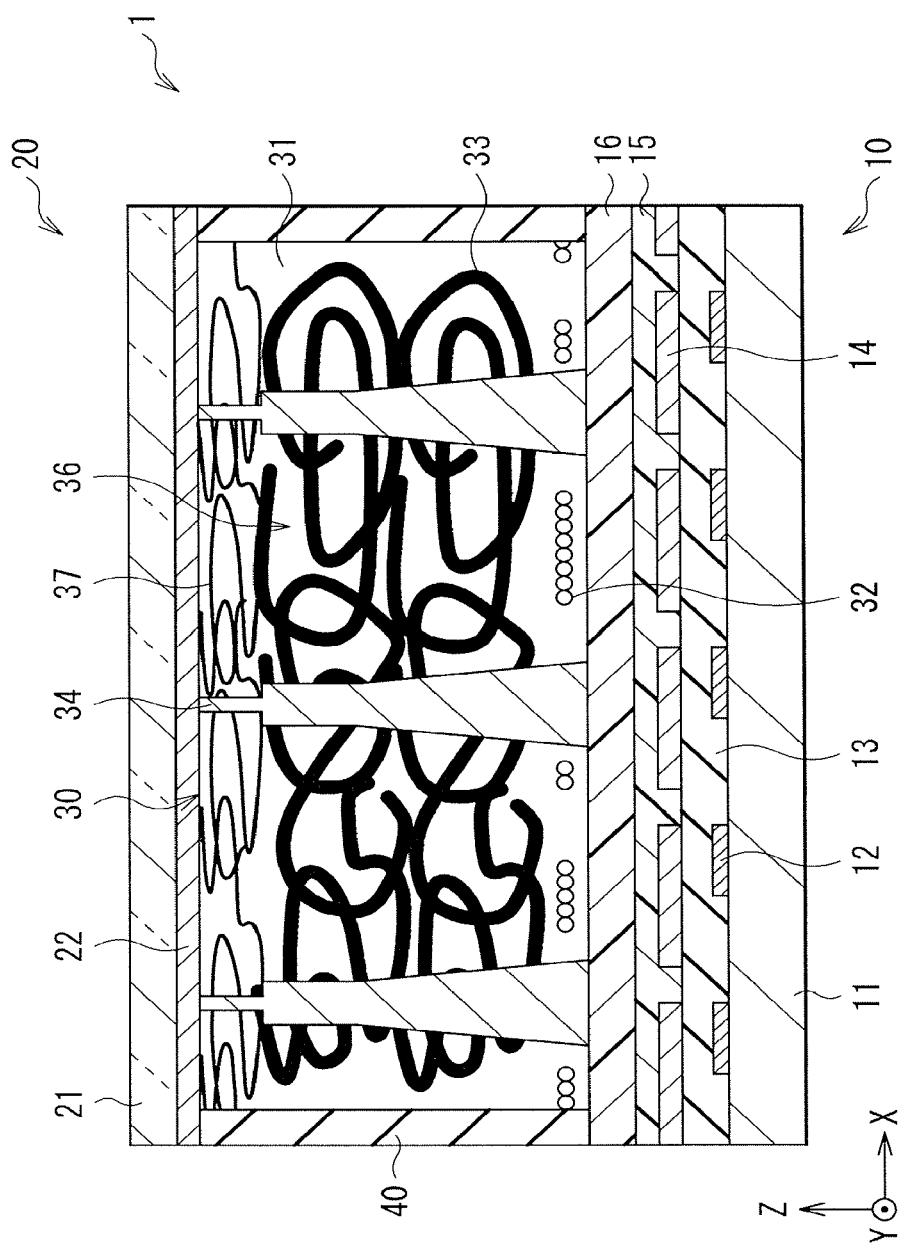
FIG. 1 is a cross-sectional diagram illustrating a configuration of a display unit according to an embodiment of the present technology.

FIG. 1 illustrates a cross-sectional configuration of a display unit (a display unit 1) according to an embodiment of the present technology. The display unit 1 is an electrophoretic display that displays an image by utilizing an electrophoretic phenomenon. The display unit 1 includes an electrophoretic device 30 between a drive substrate 10 and a counter substrate 20. A space between the drive substrate 10 and the counter substrate 20 is formed by a spacer 40, and an image is displayed on the counter substrate 20 side. It is to be noted that FIG. 1 schematically illustrates a configuration of the display unit 1, and the actual size and shape thereof may be different from those illustrated therein.

The electrophoretic device 30 is applicable to various uses. Although a case in which the electrophoretic device 30 is applied to the display unit 1 will be described here, the configuration of the display unit 1 is one example, and is modifiable as appropriate. Further, the electrophoretic device 30 may be used for anything other than a display unit, and the application thereof is not limited in particular.

The drive substrate 10 may include, for example, a TFT (Thin Film Transistor) 12, a protective layer 13, and a pixel electrode 14 in this order, on one surface of a supporting member 11. The TFT 12 and the pixel electrode 14 may be arranged in a matrix or segmented, corresponding to a pixel arrangement.

The supporting member 11 may be configured of, for example, any of an inorganic material, a metallic material, a plastic material, and the like which are plate-shaped. Examples of the inorganic material may include silicon (Si), silicon oxide (SiOX), silicon nitride (SiNX), and aluminum oxide (AlOx). Examples of the silicon oxide may include glass and spin-on-glass (SOG). Examples of the metallic material may include aluminum (Al), nickel (Ni), and stainless steel. Examples of the plastic material may include polycarbonate (PC), polyethylene terephthalate (PET), polyethylene naphthalate (PEN), and polyethyl ether ketone (PEEK).

In the display unit 1, an image is displayed on the counter substrate 20 side and thus, the supporting member 11 may be optically non-transparent. The supporting member 11 may be configured of a rigid substrate such as a wafer, or may be configured of a thin-layer of glass, a film, or the like having flexibility. The display unit 1 that is flexible (foldable) is achievable by using a flexible material for the supporting member 11.

The TFT 12 is a switching device used to select a pixel. The TFT 12 may be an inorganic TFT using an inorganic semiconductor layer as a channel layer, or may be an organic TFT using an organic semiconductor layer as a channel layer. The protective layer 13 may be made of, for example, an insulating resin material such as polyimide, and flattens the surface of the supporting member 11, on which surface the TFT 12 is provided. The pixel electrode 14 may be formed of, for example, a conductive material such as gold (Au), silver (Ag), copper (Cu), aluminum (Al), an aluminum alloy, and Indium Tin Oxide (ITO). The pixel electrode 14 may be configured using two or more kinds of conductive materials. The pixel electrode 14 is connected to the TFT 12 through a contact hole (not illustrated) provided in the protective layer 13.

Between the drive substrate 10 and the electrophoretic device 30, a bonding layer (or an adhesive layer) 15 and a sealing layer 16 are provided. The bonding layer 15 is provided to bond the drive substrate 10 and the sealing layer 16 together, and may be configured of, for example, acrylic-based resin or urethane-based resin. A rubber-based adhesive sheet may be used for the bonding layer 15. The sealing layer 16 is provided to seal an insulating liquid (an insulating liquid 31 to be described later) in the electrophoretic device 30, and also to prevent entering of moisture and the like into the electrophoretic device 30. The sealing layer 16 may be configured of, for example, acrylic-based resin, urethane-based resin, a rubber-based adhesive sheet, or the like.

The counter substrate 20 may include, for example, a supporting member 21 and a counter electrode 22. The counter electrode 22 is provided on a whole surface (a surface facing the drive substrate 10) of the supporting member 21. The counter electrode 22 may be arranged in a matrix or segmented, in a manner similar to the pixel electrode 14.

A material similar to that of the supporting member 11 may be used for the supporting member 21, as long as the material is optically transparent. For example, a translucent conductive material (a transparent electrode material) such as Indium Tin Oxide (ITO), Antimony Tin Oxide (ATO), Fluorine doped Tin Oxide (FTO), and Aluminum Zinc Oxide (AZO) may be used for the counter electrode 22.

The electrophoretic device 30 is to be viewed through the counter electrode 22. Therefore, the optical transparency (transmittance) of the counter electrode 22 may be preferably as high as possible, and may be, for example, about 80% or more. In addition, preferably, the electrical resistance of the counter electrode 22 may be as low as possible, and may be, for example, about 100Ω/□ or less.

The electrophoretic device 30 causes contrast by utilizing an electrophoretic phenomenon. An electrophoretic particle 32, a porous layer 33, a partition 34, and a second fibrous structure 37 are included in the insulating liquid 31.

The insulating liquid 31 fills a space surrounded by the drive substrate 10 (the sealing layer 16), the counter substrate 20, and the spacer 40, and may be configured of, for example, an organic solvent such as paraffin and isoparaffin. For the insulating liquid 31, one kind of organic solvent may be used, or two or more kinds of organic solvents may be used. A viscosity and a refractive index of the insulating liquid 31 may be preferably as low as possible. When the viscosity of the insulating liquid 31 is made low, mobility (a response speed) of the electrophoretic particle 32 improves. Further, energy (power consumption) necessary for movement of the electrophoretic particle 32 becomes low accordingly. When the refractive index of the insulating liquid 31 is lowered, a difference in refractive index between the insulating liquid 31 and the porous layer 33 grows, which increases optical reflectance of the porous layer 33. The refractive index of the insulating liquid 31 may be, for example, about 1.48.

For example, a coloring agent, a charge control agent, a dispersion stabilizer, a viscosity modifier, a surfactant, a resin, or the like may be added to the insulating liquid 31.

The electrophoretic particle 32 dispersed in the insulating liquid 31 is one or more charged particles (electrophoretic particles), and the electrophoretic particle 32 thus charged moves between the pixel electrode 14 and the counter electrode 22 in response to an electric field. The electrophoretic particle 32 has any optical reflection properties (optical reflectance), and contrast is caused by a difference between optical reflectance of the electrophoretic particle 32 and optical reflectance of the porous layer 33. In the display unit 1, the optical reflectance of the electrophoretic particle 32 is lower than that of the porous layer 33, and dark display is performed by the electrophoretic particle 32, while bright display is performed by the porous layer 33.

Therefore, when the electrophoretic device 30 is viewed from outside, the electrophoretic particle 32 may be visually recognized as, for example, black or a color close to black. Such a color of the electrophoretic particle 32 is not limited in particular, as long as the color is capable of causing the contrast.

The electrophoretic particle 32 may be configured of, for example, a particle (powder) of a material such as an organic pigment, an inorganic pigment, a dye, a carbon material, a metallic material, a metal oxide, glass, and a polymer material (resin). Of these, any one kind or two or more kinds may be used for the electrophoretic particle 32. The electrophoretic particle 32 may also be a crushed particle or a capsule particle of a resin solid content including the above-described particle. It is to be noted that materials equivalent to the above-listed carbon material, metallic material, metal oxide, glass, and polymer material are excluded from materials equivalent to the above-mentioned organic pigment, inorganic pigment, and dye.

Examples of the organic pigment may include azo pigments, metal complex azo pigments, polycondensation azo pigments, flavanthrone pigments, benzimidazolone pigments, phthalocyanine pigments, quinacridone pigments, anthraquinone pigments, perylene pigments, perinone pigments, anthrapyridine pigments, pyranthrone pigments, dioxazine pigments, thioindigo pigments, isoindolinone pigments, quinophthalone pigments, and indanthrene pigments. Examples of the inorganic pigment may include hydrozincite, antimony white, black iron oxide, titanium boride, red oxide, mapico yellow, minium, cadmium yellow, zinc sulphide, lithopone, barium monosulfide, cadmium selenide, calcium carbonate, barium sulfate, lead chromate, lead sulfate, barium carbonate, white lead, and alumina white. Examples of the dye may include nigrosine dyes, azo dyes, phthalocyanine dyes, quinophthalone dyes, anthraquinone dyes, and methine dyes. Examples of the carbon material may include carbon black. Examples of the metallic material may include gold, silver, and copper. Examples of the metal oxide may include titanium oxide, zinc oxide, zirconium oxide, barium titanate, potassium titanate, copper-chromium oxide, copper-manganese oxide, copper-iron-manganese oxide, copper-chromium-manganese oxide, and copper-iron-chromium oxide. Examples of the polymer material may include a high molecular compound into which a functional group having an optical absorption spectrum in a visible light region is introduced. As long as such a high molecular compound having the optical absorption spectrum in the visible light region is adopted, the kind thereof is not limited in particular.

Specifically, for example, the carbon material such as carbon black, the metal oxide such as copper-chromium oxide, copper-manganese oxide, copper-iron-manganese oxide, copper-chromium-manganese oxide, and copper-iron-chromium oxide, or the like may be used for the electrophoretic particle 32 performing dark display. Above all, preferably, the carbon material may be used for the electrophoretic particle 32. The electrophoretic particle 32 made of the carbon material exhibits superior chemical stability, mobility, and a light absorption property.

The content (density) of the electrophoretic particle 32 in the insulating liquid 31 is not limited in particular, but may be, for example, about 0.1 wt % to about 10 wt %. In this density range, shieldability and mobility of the electrophoretic particle 32 are secured. Specifically, when the content of the electrophoretic particle 32 is below 0.1 wt %, shielding (concealment) of the porous layer 33 by the electrophoretic particle 32 may be difficult, and contrast may not be sufficiently produced. On the other hand, when the content of the electrophoretic particle 32 is above 10 wt %, dispersibility of the electrophoretic particle 32 may decrease, making the electrophoretic particle 32 move less easily, thereby leading to a possibility of occurrence of agglomeration.

Preferably, the electrophoretic particle 32 may be readily dispersed and charged in the insulating liquid 31 for a long time, while being less easily adsorbed on the porous layer 33. Therefore, for example, a dispersant or an electric charge modifier may be added to the electrophoretic particle 32. The dispersant and the electric charge modifier may be used together.

The dispersant or the electric charge modifier may have, for example, either positive charges or negative charges, or both types of charges. The dispersant or the electric charge modifier is provided to increase an electric charge amount in the insulating liquid 31, and to disperse the electrophoretic particle 32 by electrostatic repulsion. Examples of such a dispersant may include the Solsperse series available from The Lubrizol Corporation, the BYK series as well as the Anti-Terra series available from BYK-Chemie GmbH, and the Span series available from ICI Americas Inc.

In order to improve dispersibility of the electrophoretic particle 32, a surface treatment may be applied to the electrophoretic particle 32. Examples of the surface treatment may include a rosin treatment, a surfactant treatment, a pigment derivative processing, a coupling agent treatment, a graft polymerization treatment, and a microencapsulation treatment. In particular, any of the graft polymerization treatment, the microencapsulation treatment, and a combination of these treatments makes it possible to maintain long-term dispersion stability of the electrophoretic particle 32.

Used for the surface treatment may be, for example, a material that includes a functional group capable of being adsorbed on the surface of the electrophoretic particle 32 and a polymeric functional group (namely, an adsorptive material). The functional group capable of being adsorbed is determined according to the material forming the electrophoretic particle 32. For example, an aniline derivative such as 4-vinyl aniline when the electrophoretic particle 32 is configured of the carbon material such as carbon black, and an organosilane derivative such as methacrylate-3-(trimethoxysilyl)propyl when the electrophoretic particle 32 is configured of the metal oxide, may be allowed to be adsorbed. Examples of the polymeric functional group may include a vinyl group, an acrylic group, and a methacryl group.

A surface treatment may be performed by introducing a polymeric functional group onto the surface of the electrophoretic particle 32, and causing graft thereon (namely, a graft material). The graft material has a polymeric functional group and a functional group for dispersion. The functional group for dispersion disperses the electrophoretic particle 32 in the insulating liquid 31, and maintains dispersibility by steric hindrance thereof. When the insulating liquid 31 is, for example, paraffin, a branched-alkyl group or the like may be used as the functional group for dispersion. Examples of the polymeric functional group may include a vinyl group, an acrylic group, and a methacryl group. In order to cause polymerization and graft of the graft material, a polymerization initiator such as azobisisobutyronitrile (AIBN), for example, may be used.

For reference, details of a way of dispersing the electrophoretic particle 32 in the insulating liquid 31 as described above are described in books such as "Dispersion technology of ultrafine particles and evaluation thereof: surface treatment and fine grinding, as well as dispersion stability in air/liquid/polymer (Science & Technology Co., Ltd.)".

Figure 2:
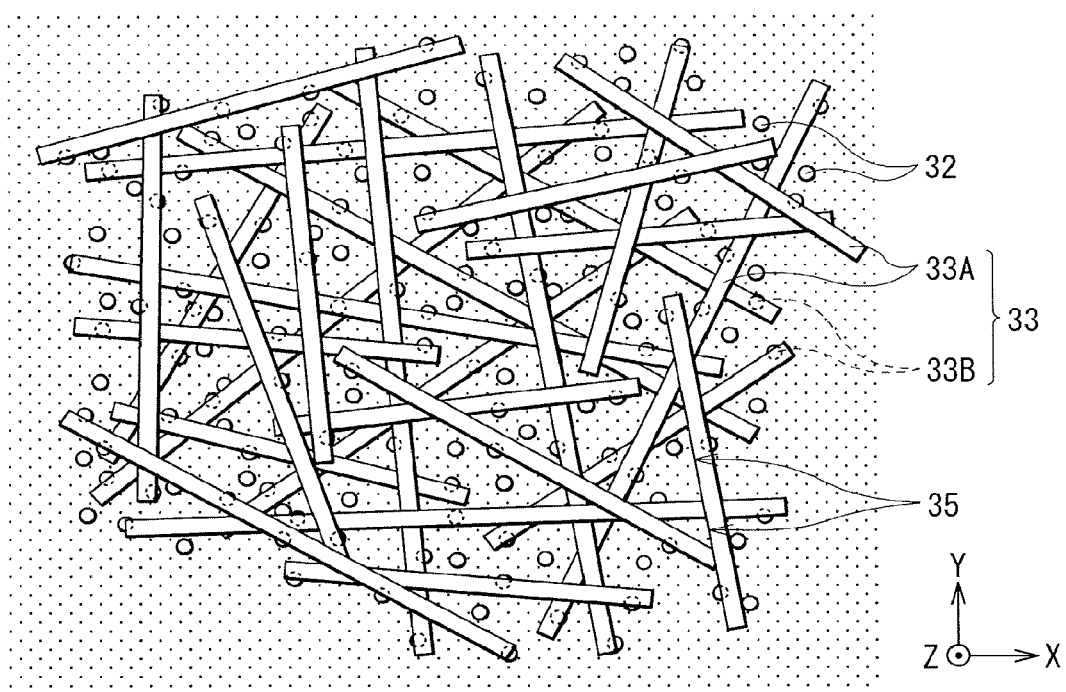
FIG. 2 is a plan view illustrating a configuration of an electrophoretic device illustrated in FIG. 1.

The porous layer 33 is capable of shielding the electrophoretic particle 32. The porous layer 33 includes a first fibrous structure 33A and a non-electrophoretic particle 33B held in the first fibrous structure 33A as illustrated in FIG. 2.

The porous layer 33 is a three-dimensional structure formed using the first fibrous structure 33A (an irregular network structure such as a nonwoven fabric), and has a plurality of clearances (pores 35). By configuring the three-dimensional structure of the porous layer 33 through use of the first fibrous structure 33A, it is possible to ensure that the pore 35 has a size large enough to allow movement of the electrophoretic particle 32, and it is also possible to maintain high contrast even when the porous layer 33 has a small thickness. Specifically, diffused reflection (multiple scattering) of light (external light) is caused by the three-dimensional structure of the porous layer 33, and the optical reflectance of the porous layer 33 increases. Therefore, it is possible to obtain high optical reflectance even when the thickness of the porous layer 33 is small. In addition, through use of the first fibrous structure 33A, an average pore size of the pores 35 is made large, and a large number of pores 35 are provided in the porous layer 33. This makes the electrophoretic particle 32 move more easily through the pores 35, increases a response speed, and further reduces energy necessary to move the electrophoretic particle 32. The thickness (in a Z direction) of the porous layer 33 described above may be, for example, about 5 μm to about 100 μm.

The first fibrous structure 33A is a fibrous substance having a length that is sufficiently long relative to a fiber diameter (a diameter). For example, a plurality of first fibrous structures 33A may gather and be stacked at random, to configure the porous layer 33. The single first fibrous structure 33A may be twisted at random to configure the porous layer 33. Alternatively, the porous layer 33 configured of the single first fibrous structure 33A and the porous layer 33 configured of the plurality of first fibrous structures 33A may be mixed. FIG. 2 illustrates a case in which the porous layer 33 is configured of the plurality of first fibrous structures 33A.

The first fibrous structure 33A may be configured of, for example, a polymer material, an inorganic material, or the like. Examples of the polymer material may include nylon, polylactic acid, polyamide, polyimide, polyethylene terephthalate, polyacrylonitrile, polyethyleneoxide, polyvinylcarbazole, polyvinyl chloride, polyurethane, polystyrene, polyvinyl alcohol, polysulfone, polyvinylpyrrolidone, polyvinylidene fluoride, polyhexafluoropropylene, cellulose acetate, collagen, gelatin, chitosan, and copolymers of these materials. Examples of the inorganic material may include titanium oxide. The polymer material may be preferably used for the first fibrous structure 33A. This is because the polymer material is low in reactivity to light and the like, and chemically stable. In other words, use of the polymer material prevents an unintended decomposition reaction of the fibrous structure 33A. When the fibrous structure 33A is configured of a material with high reactivity, preferably, the surface thereof may be coated with any protective layer.

The first fibrous structure 33A may, for example, extend linearly. The first fibrous structure 33A may have any shape, and may be, for example, curled or bent at some point. Alternatively, the first fibrous structure 33A may be branched at some point, or may be wavy. When the first fibrous structures 33A having wavy shapes are intertwined with each other, the structure of the porous layer 33 is made complicated, which allows an improvement in optical property.

An average fiber diameter of the first fibrous structure 33A may be, for example, preferably, about 1 nm or more and about 10,000 nm or less, and in particular, about 1 nm or more and about 100 nm or less. A method of forming a porous layer using cellulose, velvet, or the like has been proposed (see, for example. Japanese Examined Patent Publication No. S50-15120). However, their refractive indexes are close to that of an insulating liquid, and contrast may decrease. In addition, the fiber diameter of each of cellulose and velvet is about 10 μm to about 100 μm, which is large. In contrast, making the average fiber diameter small as described above makes the diffused reflection of light more easily occur, and also makes the aperture of the pore 35 large. The fiber diameter is determined so that the first fibrous structure 33A is allowed to hold the non-electrophoretic particle 33B. It may be possible to measure the average fiber diameter through, for example, microscopy using a scanning electron microscope or the like. The average length of the first fibrous structure 33A is optional. The first fibrous structure 33A may be formed by, for example, a phase separation method, a phase inversion method, an electrostatic (electric field) spinning method, a melt spinning method, a wet spinning method, a dry spinning method, a gel spinning method, a sol-gel method, a spray coating method, or the like. Use of any of these methods makes it possible to easily and stably form the first fibrous structure 33A having a length that is sufficiently long relative to the fiber diameter.

The first fibrous structure 33A may be configured of preferably a nanofiber. Here, the nanofiber is a fibrous substance having a fiber diameter of about 1 nm to about 100 nm, and having a length hundred times or more the fiber diameter. Use of such a nanofiber for the first fibrous structure 33A makes the diffused reflection of light easily occur and increases the optical reflectance of the porous layer 33 further. In other words, it is possible to enhance the contrast of the electrophoretic device 30. In addition, in the first fibrous structure 33A made of the nanofiber, a ratio of the pores 35 occupying a unit volume is made large, and the movement of the electrophoretic particle 32 through the pore 35 is made easy. Therefore, it is possible to reduce energy necessary for the movement of the electrophoretic particle 32. The first fibrous structure 33A made of the nanofiber may be preferably formed by an electrostatic spinning method. Use of the electrostatic spinning method makes it possible to form the first fibrous structure 33A having a small fiber diameter, easily and stably.

For the first fibrous structure 33A, a structure whose optical reflectance is higher than the optical reflectance of the electrophoretic particle 32 may be preferably used. This makes it easy to form contrast by a difference in optical reflectance between the porous layer 33 and the electrophoretic particle 32. When the first fibrous structure 33A does not substantially affect the optical reflectance of the porous layer 33, in other words, when the optical reflectance of the porous layer 33 is determined by the non-electrophoretic particle 33B, the first fibrous structure 33A exhibiting optical transparency (colorlessness and transparency) in the insulating liquid 31 may be used.

The pore 35 is configured by overlaps among the plurality of first fibrous structures 33A, or twists of the single first fibrous structure 33A. The pore 35 may preferably have a largest possible average pore size, to allow easy movement of the electrophoretic particle 32 through the pore 35. The average pore size of the pore 35 may be, for example, about 0.1 μm to about 10 μm.

The non-electrophoretic particle 33B is fixed to the first fibrous structure 33A, and is one or more particles that are not electrophoresed. The non-electrophoretic particle 33B may be buried in the first fibrous structure 33A holding the non-electrophoretic particle 33B, or may be partially exposed from the first fibrous structure 33A.

A material having optical reflectance different from that of the electrophoretic particle 32, specifically, a material having higher optical reflectance is used for the non-electrophoretic particle 33B. The non-electrophoretic particle 33B may be configured using a material similar to that of the electrophoretic particle 32 described above. Specifically, metal oxide or the like such as titanium oxide, zinc oxide, zirconium oxide, barium titanate, and potassium titanate may be preferably used for the non-electrophoretic particle 33B to perform bright display. This makes it possible to obtain superior chemical stability, fixity, and light reflectivity. The non-electrophoretic particle 33B and the electrophoretic particle 32 may be configured of the same material or different materials. The non-electrophoretic particle 33B may be visually recognized from outside as, for example, white or a color close to white.

Between the porous layer 33 and the counter substrate 20 (a display surface), the second fibrous structure 37 is provided. The second fibrous structure 37 is a three-dimensional structure as with the first fibrous structure 33A, and covers the porous layer 33. The second fibrous structure 37 does not hold any non-electrophoretic particle, and may preferably exhibit high optical transparency in the insulating liquid 31. Providing the second fibrous structure 37 as described above makes it possible to improve the contrast.

A difference between the refractive index of the insulating liquid 31 and the refractive index of the second fibrous structure 37 may be preferably smaller than a difference between the refractive index of the insulating liquid 31 and the refractive index of the first fibrous structure 33A. The difference between the refractive index of the insulating liquid 31 and the refractive index of the second fibrous structure 37 may be, for example, about 0.02 or less (from about −0.02 to about +0.02), and the refractive index of the second fibrous structure 37 may be, for example, about 1.4 to about 1.5. A material similar to that of the above-described first fibrous structure 33A may be used for the second fibrous structure 37.

In a case in which the second fibrous structure is not provided, the electrophoretic particle is taken into the pore of the first fibrous structure (the porous layer) on the counter substrate side when dark display is performed. In other words, on the counter substrate (the display surface) side, the porous layer having high optical reflectance is partially exposed, and it is difficult to reduce the optical reflectance of the dark display sufficiently. In contrast, when the second fibrous structure 37 is provided, the electrophoretic particle 32 after moving to the counter substrate 20 side is taken into the pore 35 of the second fibrous structure 37 closer to the display surface, thereby shielding the porous layer 33 effectively. Therefore, the second fibrous structure 37 reduces the optical reflectance at the time of dark display, making it possible to enhance the contrast. The second fibrous structure 37 may have a thickness of, for example, about 1 µm to about 5 µm.

The partition 34 is provided to partition off a space where the electrophoretic particle 32 is present in the insulating liquid 31 (a cell 36). The partition 34 extends in a lamination direction (a Z direction) of the drive substrate 10 and the counter substrate 20 from the porous layer 33 to the second fibrous structure 37 to pass therethrough. One end and the other end of the partition 34 are in contact with the sealing layer 16 and the counter electrode 22, respectively. The partition 34 as described above makes it possible to prevent the electrophoretic particle 32 from moving between the cells 36. Therefore, it is possible to improve image quality, by suppressing occurrence of display unevenness due to diffusion, convection, agglomeration, and the like of the electrophoretic particles 32. The partitions 34 may preferably have the same heights (in the Z direction). Providing the partitions 34 having the same heights allows a distance (a gap) between the sealing layer 16 and the counter electrode 22 to be kept uniform on the entire surface, thereby keeping field intensity constant. Thus, nonuniformity of the response speed is resolved. The height of the partition 34 may be, for example, about 1 µm to about 100 µm.

Figure 3A:
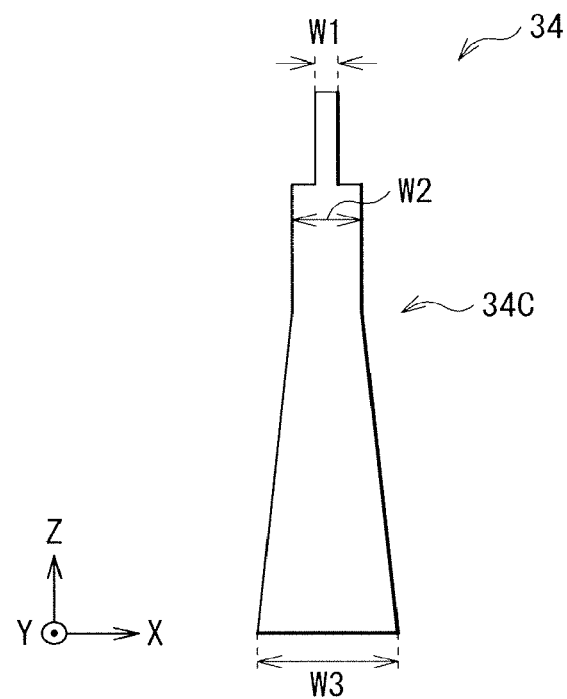
FIG. 3A is a cross-sectional diagram illustrating a configuration of a partition illustrated in FIG. 1.

As illustrated in FIG. 3A, the partition 34 has a width (a distance in an X direction) W1 in the second fibrous structure 37, and widths W2 and W3 in the porous layer 33. The width W2 is a width of a part of the partition 34 in the porous layer 33, the part being closest to the second fibrous structure 37. The width W3 is a width of a part of the partition 34, the part being farthest from the second fibrous structure 37. In the present embodiment, the width W1 of the partition 34 in the second fibrous structure 37 is smaller than the width W2 in the porous layer 33. Thus, a region (an opening section) between the partitions 34 next to each other in the second fibrous structure 37 (on the display surface side) is larger than that in the porous layer 33, which makes it possible to improve the contrast. The width W1 of the partition 34 may be preferably smaller than the width W3. The widths W may be the same or may vary in the second fibrous structure 37. The width W2 and the width W3 may be the same or may be different from each other. For example, the width W1 may be about 5 µm to about 10 µm, the width W2 may be about 10 µm to about 20 µm, and the width W3 may be about 10 µm to about 30 µm.

The partition 34 may have, for example, a narrowed section 34C where the width of the partition 34 is smallest in the porous layer 33. The width W1 in the second fibrous structure 37 may be preferably smaller than the width of the narrowed section 34C. In other words, the width W1 of the partition 34 in the second fibrous structure 37 may be preferably smaller than any of the widths (the widths W2 and W3, as well as the narrowed section 34C) in the porous layer 33.

Figure 3B:
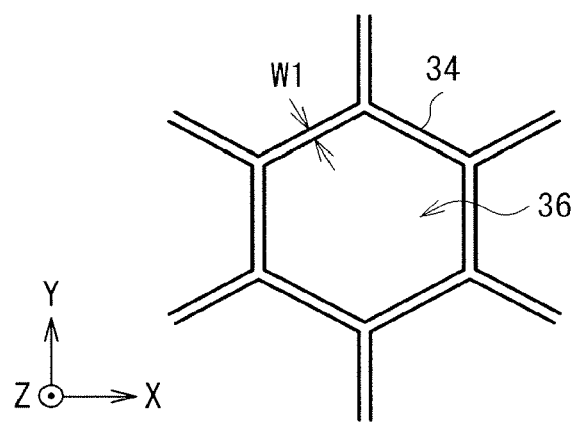
FIG. 3B is a plan view illustrating a configuration of the partition illustrated in FIG. 1.

As illustrated in FIG. 3B, the partition 34 is provided to configure the cell 36 having a regular hexagonal shape (a honeycomb structure). The cell 36 may have any shape, and may be, for example, rectangular. The plurality of cells 36 may be preferably arranged in a matrix (a plural of rows by a plurality of columns). A distance between the partitions 34 next to each other along one direction (a pitch of the partitions 34) may be, for example, about 50 µm to about 500 µm.

The partition 34 extends in the porous layer 33 as described above, and preferably, the partition 34 may support the porous layer 33. This makes a change in the position of the porous layer 33 in the insulating liquid 31 less easily occur, even when the display unit 1 is left in a sideways position or an inverted position for a long time. Therefore, contrast characteristics are allowed to be stabilized. Here, the position of the porous layer 33 refers to a positional relationship (a distance or the like) of the pixel electrode 14 and the counter electrode 22 relative to the porous layer 33.

The partition 34 may preferably include a light transmissive material, and also incorporate a part of the porous layer 33. Here, "incorporate a part of the porous layer 33" refers to a situation in which, while a state of holding the non-electrophoretic particle 33B in the fibrous structure 33A (the configuration of the porous layer 33 itself) is maintained, a part of the porous layer 33 is directly contained inside the partition 34.

A method of providing a partition in an electrophoretic device has been proposed (for example, Japanese Unexamined Patent Application Publication (Published Japanese Translation of PCT Application) No. 2003-526817). However, optical reflectance of this partition is set between optical reflectance of a porous layer and that of an electrophoretic particle, and contrast is reduced by the existence of the partition. In contrast, the partition 34 is configured of the light transmissive material and also incorporates the part of the porous layer 33 and thus, it is possible to prevent a decline in the contrast. Specifically, it is possible to suppress light reflection or light absorption due to the partition 34, because the partition 34 includes the light transmissive material. Further, the non-electrophoretic particle 33B included in the partition 34 causes diffused reflection of light to increase the optical reflectance at the time of bright display, because the partition 34 incorporates the part of the porous layer 33. Therefore, it is possible to improve the contrast.

The partition 34 may include, for example, a photosensitive resin material as the light transmissive material. Use of the photosensitive resin material makes it possible to readily and stably form the partition 34 incorporating the part of the porous layer 33. The photosensitive resin material may be a resin in which optical patterning is possible, some examples of which may include photocurable resins of a photocrosslinking reaction type, a photomodification type, a photopolymerization reaction type, and a photodegradation reaction type. The partition 34 may be configured of one kind of photosensitive resin material, or may include two or more kinds of photosensitive resin materials. It is possible to prevent the partition 34 from affecting an electrophoretic phenomenon of the electrophoretic particle 32, by using, for example, a chemically stable photoresist as the photosensitive resin material. The photoresist may be of either of a negative type and a positive type. A light source used to pattern the photosensitive resin may be of any type. Usable examples of the light source may include a semiconductor laser, an excimer laser, an electron beam, an ultraviolet ray, a metal-halide lamp, and a high-pressure mercury-vapor lamp.

The spacer 40 may be configured of, for example, an insulating material such as a polymer material, and be provided, for example, in a grid between the drive substrate 10 and the counter substrate 20. For example, a sealant including fine particles may also be used for the spacer 40. An arrangement shape of the spacer 40 is not limited in particular, but may be preferably provided to distribute the electrophoretic particles 32 uniformly, without disturbing the movement of the electrophoretic particles 32. The spacer 40 may have, for example, a thickness of about 10 µm to about 100 µm, and may be preferably as thin as possible. This makes it possible to suppress power consumption.

The display unit 1 as described above may be manufactured by, for example, the following procedures (FIG. 4A to FIG. 5B).

Figure 4A:
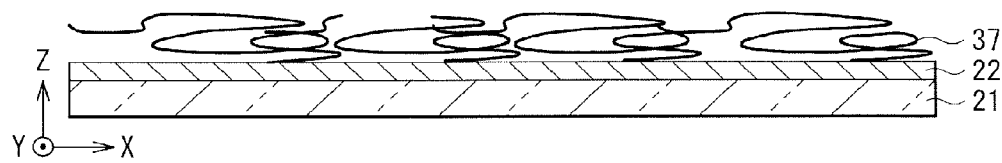
FIG. 4A is a cross-sectional diagram illustrating an example of a process of manufacturing the display unit illustrated in FIG. 1.

First, after the counter substrate 20 is formed by providing the counter electrode 22 on one surface of the supporting member 21, the second fibrous structure 37 is formed on the counter electrode 22 (FIG. 4A). The counter electrode 22 may be formed using an existing method such as various film forming methods. The second fibrous structure 37 may be formed by performing, for example, spinning. The second fibrous structure 37 may be obtained by, for example, preparing a solution, in which polyacrylonitrile is dispersed or dissolved in N,N'-dimethylformamide, as a spinning solution, and performing an electrostatic spinning method using this solution. In place of the electrostatic spinning method, a phase separation method, a phase inversion method, a melt spinning method, a wet spinning method, a dry spinning method, a gel spinning method, a sol-gel method, a spray coating method, or the like may be used.

Figure 4B:
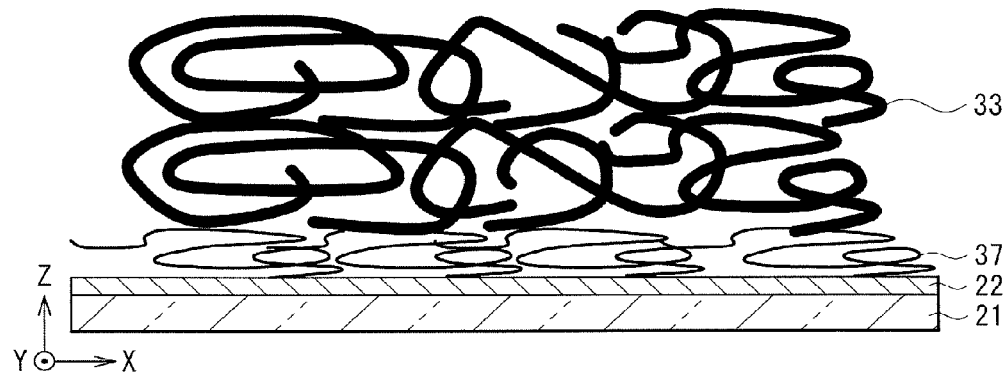
FIG. 4B is a cross-sectional diagram illustrating a process following the process in FIG. 4A.

After the second fibrous structure 37 is provided on the counter electrode 22, the porous layer 33 is formed on the second fibrous structure 37 (FIG. 4B). The porous layer 33 may be formed by, for example, spinning a spinning solution, after adding a titanium oxide to the spinning solution as the non-electrophoretic particle 33B and stirring this sufficiently. This makes it possible to form the porous layer 33 in which the non-electrophoretic particle 33B is held in the first fibrous structure 33A. The spinning solution may be prepared by, for example, dispersing or dissolving polyacrylonitrile in N,N'-dimethylformamide as the first fibrous structure 33A. For example, an electrostatic spinning method may be used for the spinning.

It is preferable to use a spinning method for the formation of the first fibrous structure 33A and the second fibrous structure 37. A method of forming a porous layer by perforating a polymeric film through use of laser beam processing has been also proposed (see, for example, Japanese Unexamined Patent Application Publication No. 2005-107146). In this method, however, only a large hole having an aperture of about 50 µm is formed, and it may be difficult to shield an electrophoretic particle completely by the porous layer.

Figure 4C:
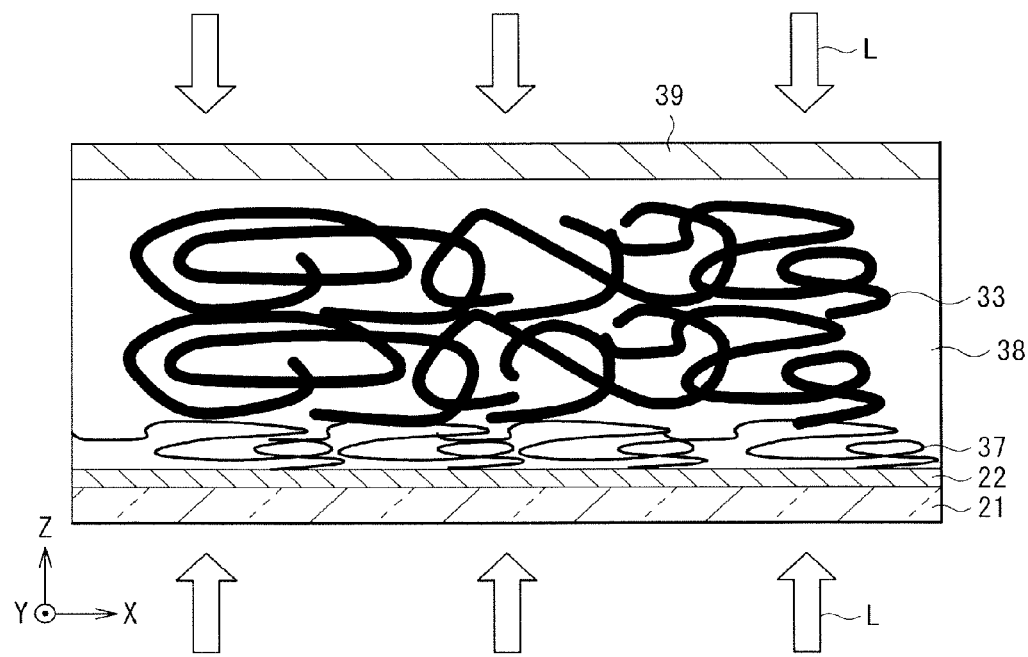
FIG. 4C is a cross-sectional diagram illustrating a process following the process in FIG. 4B.

Next, a solution (e.g., a UV-curable resin 38) in which a material of the partition 34 is dissolved in an organic solvent or the like as necessary is prepared, and this solution is applied to the surface of the counter electrode 22 to fill the porous layer 33. Next, a plate-shaped supporting member 39 is disposed on the UV-curable resin 38 (FIG. 4C). The supporting member 39 controls a coating thickness of the UV-curable resin 38, and it is possible to adjust the height of the partition 34 through use of the supporting member 39. The supporting member 39 may be configured of, for example, a material similar to that of the supporting member 21, and have optical transparency. The supporting member 39 may have light reflectivity or light absorption. The UV-curable resin 38 may be, for example, a negative-type photoresist (a UV resin). A photosensitive resin material other than the UV-curable resin 38 may be used for the material of the partition 34.

Figure 5A:
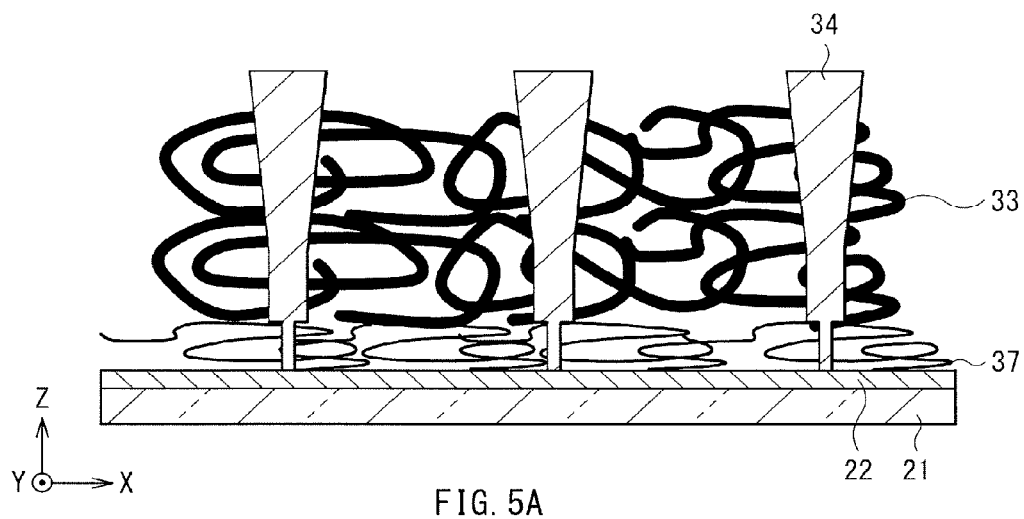
FIG. 5A is a cross-sectional diagram illustrating a process following the process in FIG. 4C.

After the supporting member 39 is provided on the UV-curable resin 38, patterning is performed by applying light L locally to the UV-curable resin 38 to form the partition 34 (FIG. 5A). Specifically, the light L is applied to every formation region of the partition 34 (FIG. 4C) to perform exposure of the UV-curable resin 38 in each region. At this moment, the light L passes through the supporting member 21 or the supporting member 39 having the optical transparency to reach the UV-curable resin 38. The light L may be, for example, a laser beam in an ultraviolet wavelength region, or the like. Use of a laser beam as the light L makes a mask unnecessary, and makes it possible to expose a desirable region readily ad precisely. It is also possible to emit lamp light in an ultraviolet wavelength region, through use of a mask. The lamp light and the laser beam may be used together.

Preferably, the light L may be applied from two directions, namely, the supporting member 39 side and the supporting member 21 side facing the supporting member 39. It is possible to maintain strength of the partition 34 and to improve contrast, by thus applying the light L to the UV-curable resin 38 from the two directions.

An amount of cured resin is largest in a part directly receiving curing energy (e.g., light), and becomes smaller as a distance in which energy propagates becomes longer. In a case in which the light L is applied from one direction, energy used to cure a range from one end to the other end of the partition 34 is necessary, and the light L of large energy is applied. At this moment, the width becomes large at the one end (the side to which the light L is applied) of the partition 34. In particular, since the porous layer having high optical reflectance inhibits propagation of light, the light L of large energy is necessary and thus, the partition is formed to have a larger width. Further, when, for example, the density of the porous layer is increased to raise the optical reflectance at the time of bright display, the light L of larger energy is necessary. In other words, the opening section becomes small, and the contrast decreases. The energy of the light L may be reduced to form the partition 34 having a decreased overall width. In this case, however, the width of the other end of the partition 34 may become too small and thus, mechanical strength necessary for the partition 34 may not be maintained.

In contrast, the partition 34 is allowed to be formed with the light L of smaller energy, by application of the light L from the two directions. Therefore, controlling the widths of the one end and the other end of the partition 34 is made easy, which makes it possible to maintain the mechanical strength and to improve the contrast. In addition, it is also possible to raise the optical reflectance of the porous layer 33, by increasing the density of the porous layer 33, and the like. The narrowed section 34C is formed at the partition 34, by thus applying the light L from the two directions.

After the application of the light L, the supporting member 39 is removed, and the UV-curable resin 38 after the exposure is developed. The UV-curable resin 38 after being developed may be heated as necessary. Thus, a non-exposed part of the UV-curable resin 38 is removed and a remaining part (an exposed part) of the UV-curable resin 38 becomes a film, to form the partition 34 incorporating a part of the porous layer 33. Here, the non-electrophoretic particle is not held in the second fibrous structure 37. Therefore, it is possible to prevent the light L applied to the counter substrate 20 (the display surface) side from being affected by the non-electrophoretic particle, and to reduce the width W1 (FIG. 3A) of the partition 34 in the second fibrous structure 37. This will be described below in detail.

Figure 6A:
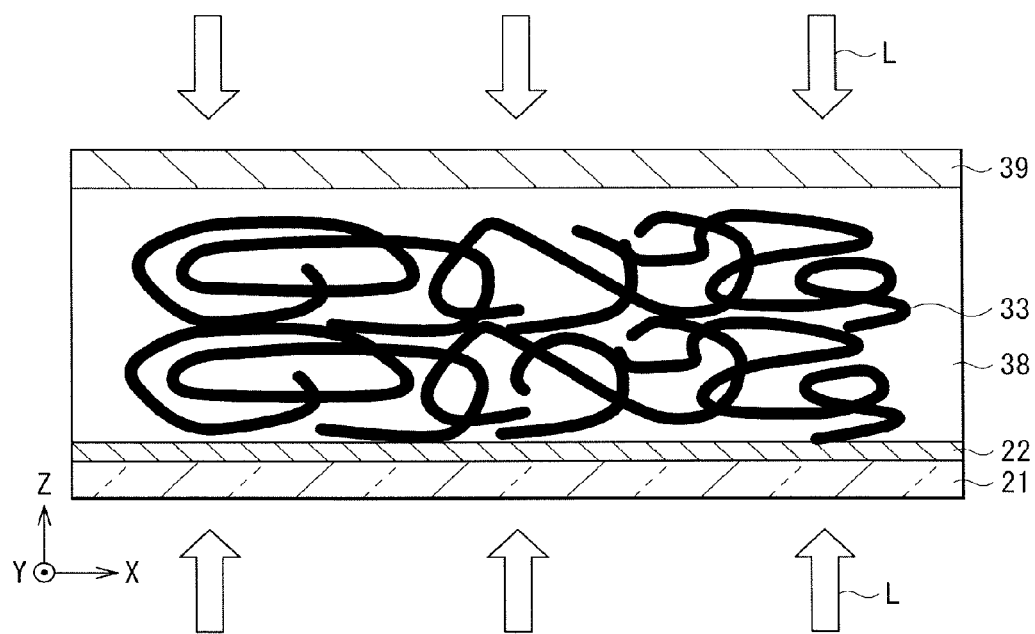
FIG. 6A is a cross-sectional diagram illustrating a process of manufacturing a display unit according to a comparative example.
Figure 6B:
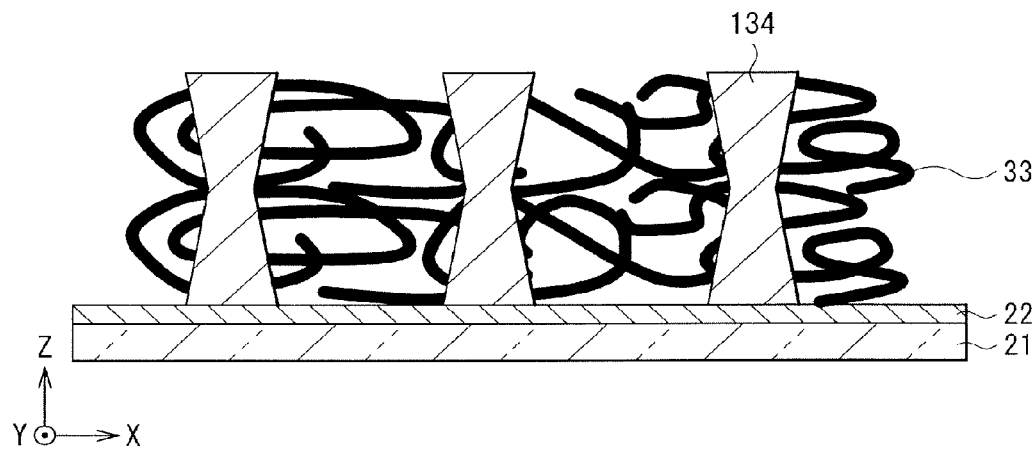
FIG. 6B is a cross-sectional diagram illustrating a process following the process in FIG. 6A.
Figure 7A:
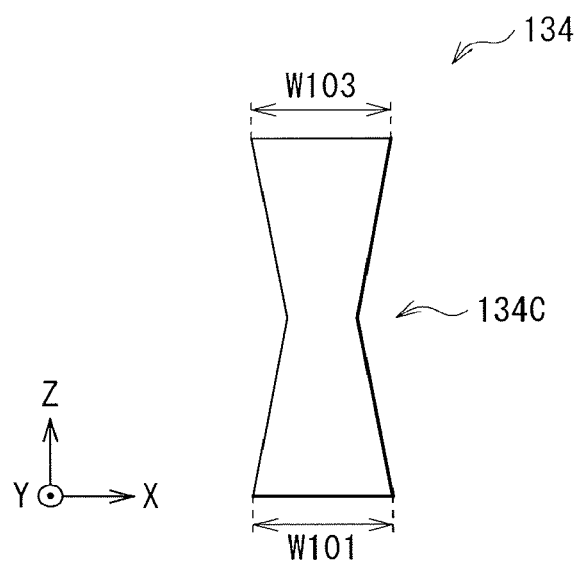
FIG. 7A is a cross-sectional diagram illustrating a configuration of a partition illustrated in FIG. 6B.
Figure 7B:
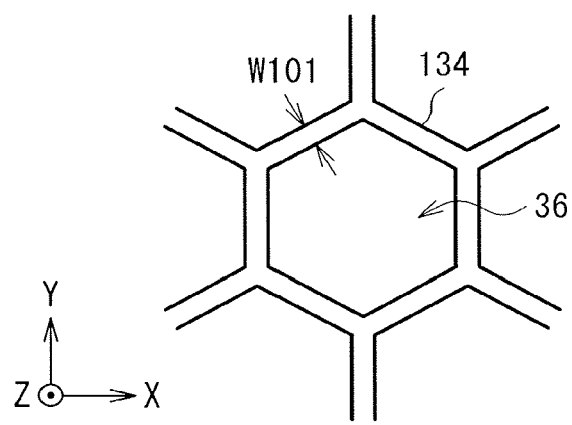
FIG. 7B is a plan view illustrating a configuration of the partition illustrated in FIG. 7A.

FIG. 6A and FIG. 6B illustrate a process of manufacturing an electrophoretic device according to a comparative example. This electrophoretic device is not provided with the second fibrous structure. In the process of manufacturing such an electrophoretic device, when light L is applied to a UV-curable resin 38 (FIG. 6A), the light L diffuses at a surface of a porous layer 33 due to a non-electrophoretic particle having high optical reflectance. In other words, an amount of cured photosensitive resin in proximity to a counter substrate 20 and an auxiliary member 39 increases (FIG. 6B), and a width of each of both ends (widths W101 and W103) of a partition 134 increases as illustrated in FIG. 7A. In particular, as the width W101 of the partition 134 on a display surface side increases, an opening section becomes small (FIG. 7B), and contrast decreases. The width W101 of the partition 134 may be, for example, about 14.4 μm to about 15.2 μm.

In contrast, in the present embodiment, the second fibrous structure 37 having the optical transparency covers the porous layer 33. In other words, the light L incident from the counter substrate 20 (the display surface) side enters the porous layer 33 after passing through the second fibrous structure 37 without being diffused. Therefore, it is possible to reduce the width W1 in the second fibrous structure 37 of the partition 34, by suppressing the amount of cured photosensitive resin in the second fibrous structure 37. This increases the region where the optical properties change due to the movement of the electrophoretic particle 32 caused by electrophoresis, thereby improving the contrast. The width W1 of the partition 34 formed on the same conditions as those of the partition 134 of the comparative example except for provision of the second fibrous structure 37 may be about 10.9 μm to about 11.0 μm. The light L is diffused at the surface of the porous layer 33, and the width W2 larger than the width W1 is formed.

Figure 5B:
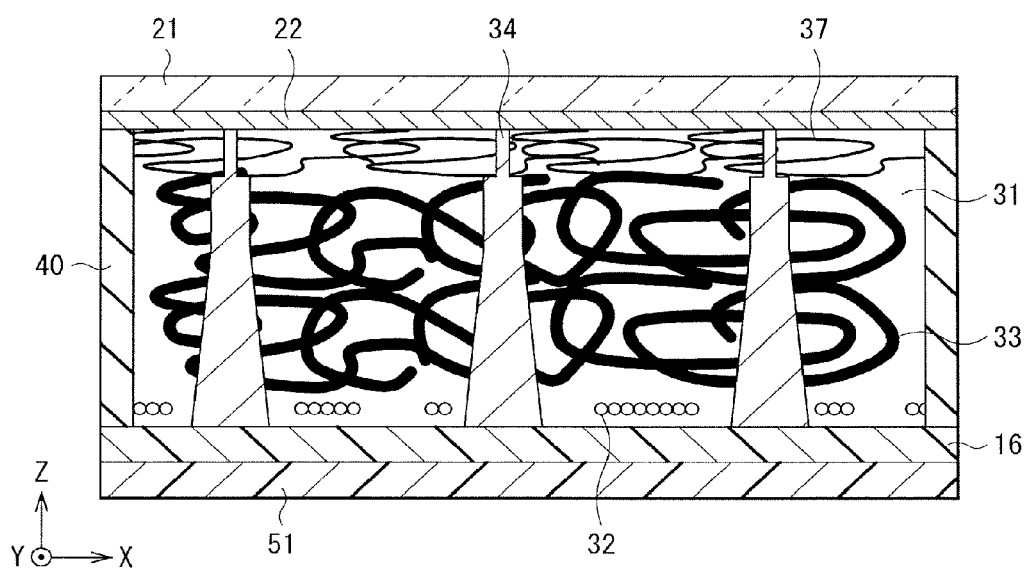
FIG. 5B is a cross-sectional diagram illustrating a process following the process in FIG. 5A.

After the partition 34 is formed, the counter substrate 20 and a release member 51 having the sealing layer 16 are disposed to face each other with the spacer 40 interposed therebetween. Next, a space between the counter substrate 20 and the sealing layer 16 is filled with the insulating liquid 31 in which the electrophoretic particles 32 are dispersed (FIG. 5B). The sealing layer 16 is then removed from the release member 51, and fixed to the drive substrate 10 by the bonding layer 15. In the drive substrate 10, the TFT 12, the protective layer 13, and the pixel electrode 14 may be formed in this order on one surface of the supporting member 11, through use of, for example, an existing method. The display unit 1 is completed by going through the above-described processes. It is also possible to manufacture the display unit 1, using a Roll to Roll method.

In the display unit 1, in the initial state, all the electrophoretic particles 32 dispersed in the insulating liquid 31 are arranged on a side close to the pixel electrode 14 (FIG. 1). At this moment, when viewed from the counter substrate 20 side, the electrophoretic device 30 is in such a state that the electrophoretic particles 32 are shielded by the porous layer 33 and an image is not displayed.

Figure 8:
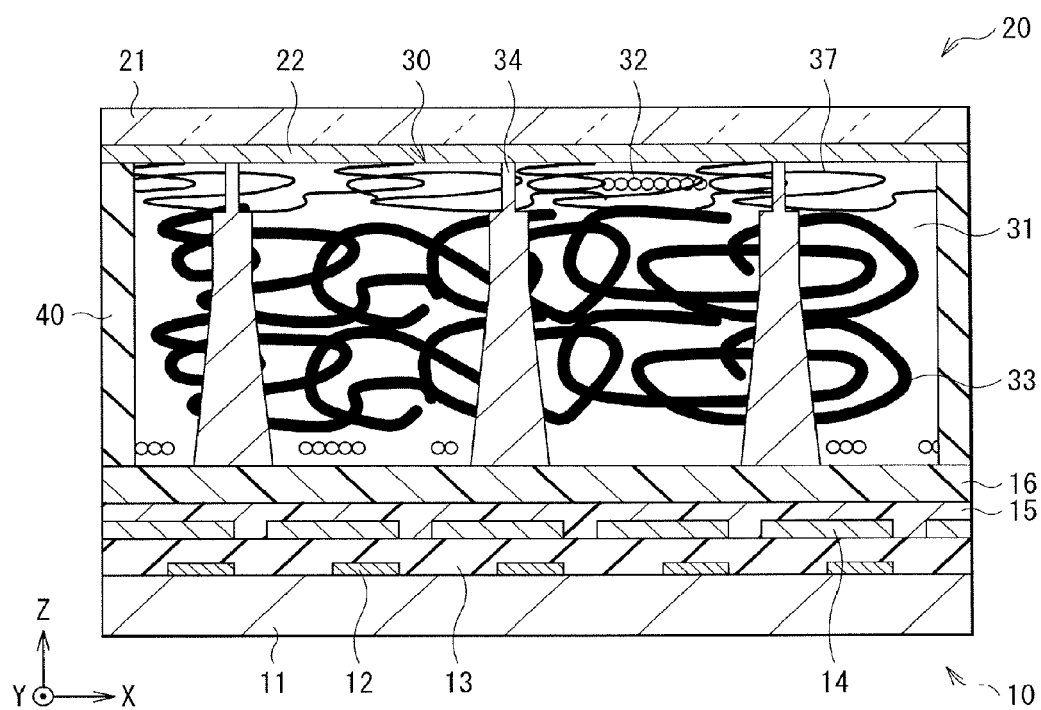
FIG. 8 is a cross-sectional diagram used to describe operation of the display unit illustrated in FIG. 1.

When a pixel is selected by the TFT 12, and an electric field is applied between the pixel electrode 14 and the counter electrode 22, the electrophoretic particle 32 in the selected pixel passes through the pore 35 of the porous layer 33 and moves towards the counter electrode 22, as illustrated in FIG. 8. At this moment, when the electrophoretic device 30 is viewed from the counter substrate 20 side, the porous layer 33 is in such a state that a pixel of dark display that is shielded by the electrophoretic particle 32 and a pixel of bright display that is not shielded are both present. The pixel of dark display and the pixel of bright display cause the contrast, to display an image on the counter substrate 20 side.

Here, the width W1 (FIG. 3A) of the partition 34 in the second fibrous structure 37 is smaller than the width W2 of the part of the partition 34, the part being closest to the second fibrous structure 37 in the porous layer 33 and thus, the opening section becomes wide. Therefore, the contrast improves.

As described above, in the electrophoretic device 30 of the present embodiment, the partition 34 has the width W1 smaller than the width W2 of the porous layer 33 in the second fibrous structure 37. Therefore, the contrast improves.

Further, the porous layer 33 is covered by the second fibrous structure 37. Thus, the partition 34 having the width W1 is allowed to be readily formed. Furthermore, the electrophoretic particle 32 after moving to the counter substrate 20 side at the time of dark display is held in the second fibrous structure 37 having the optical transparency. Therefore, the optical reflectance at the time of dark display is allowed to be reduced by shielding the porous layer 33 sufficiently. Accordingly, the contrast further improves.

In addition, the partition 34 includes the light transmissive material, and also incorporates the part of the porous layer 33. Thus, the contrast is allowed to be improved by increasing the optical reflectance at the time of bright display.

Application Examples (Display Unit)

Next, application examples of the display unit 1 will be described. The display unit 1 may be mounted on, for example, the following electronic apparatuses. However, each of configurations of the electronic apparatuses to be described below is a mere example and therefore, the configuration thereof is modifiable as appropriate.

Application Example 1

Figure 9A:
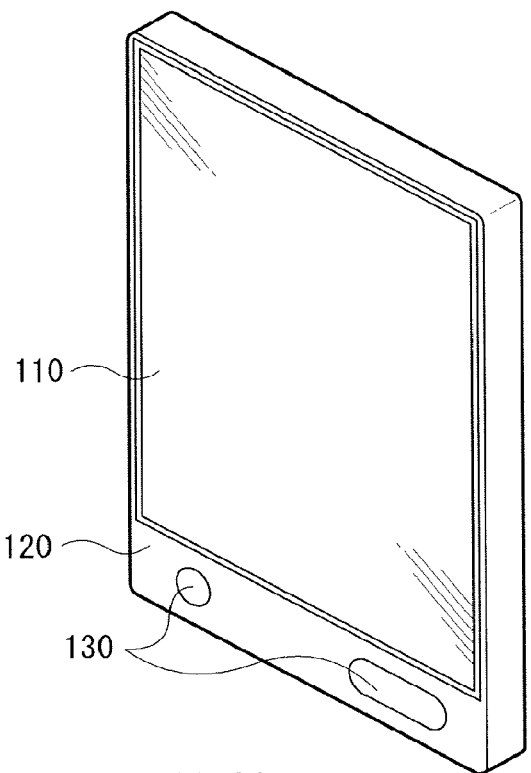
FIG. 9A is a perspective view illustrating an appearance of an application example 1.
Figure 9B:
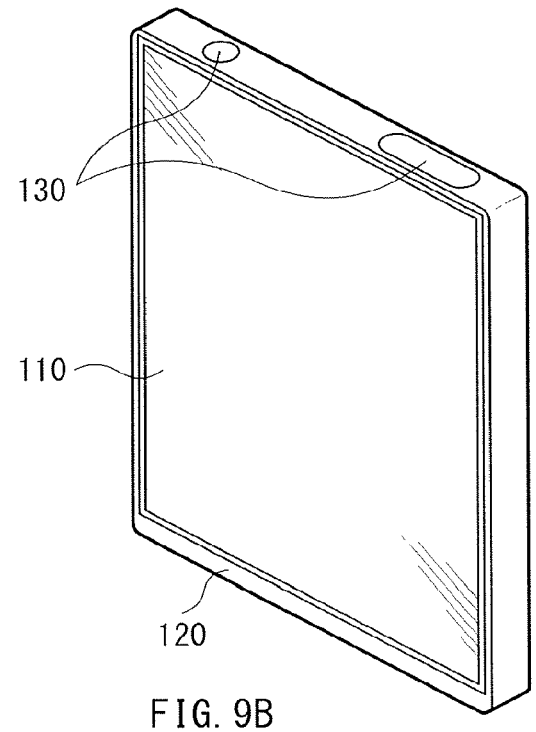
FIG. 9B is a perspective view illustrating another example of an electronic book illustrated in FIG. 9A.

FIGS. 9A and 9B each illustrate an appearance of an electronic book. This electronic book may include, for example, a display section 110, a non-display section 120, and an operation section 130. It is to be noted that the operation section 130 may be provided either on a front surface of the non-display section 120 as illustrated in FIG. 9A, or on a top surface of the non-display section 120 as illustrated in FIG. 9B. The display section 110 is configured using the display unit 1. It is to be noted that the display unit 1 may be mounted on a PDA (Personal Digital Assistant)

having a configuration similar to that of the electronic book illustrated in FIGS. 9A and 9B.

Application Example 2

Figure 10:
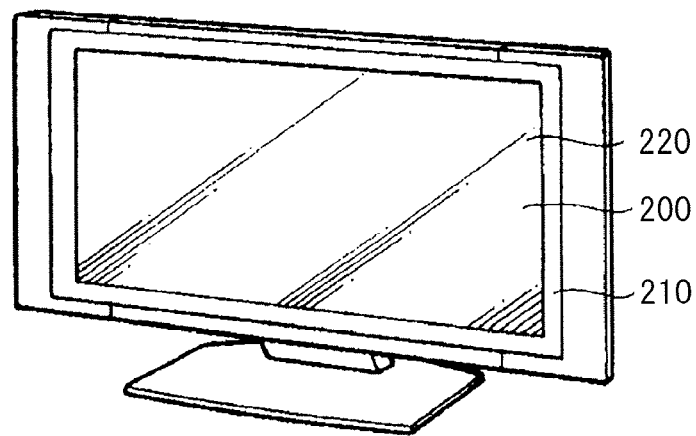
FIG. 10 is a perspective view illustrating an appearance of an application example 2.

FIG. 10 illustrates an appearance of a television receiver. This television receiver may have, for example, an image-display screen section 200 that includes a front panel 210 and a filter glass 220. The image-display screen section 200 is configured using the display unit 1.

Application Example 3

Figure 11:
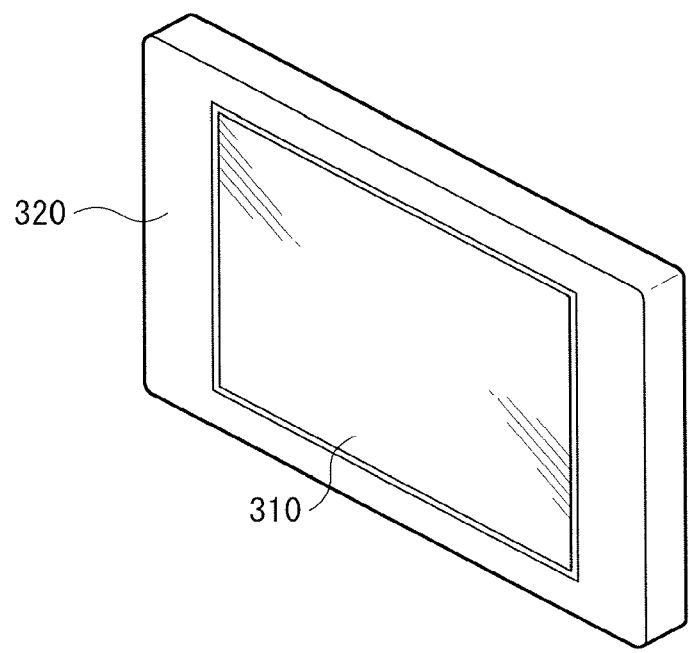
FIG. 11 is a perspective view illustrating an appearance of an application example 3.

FIG. 11 illustrates an appearance of a tablet personal computer. This tablet personal computer may include, for example, a touch panel section 310 and a housing 320. The touch panel section 310 is configured using the display unit 1.

Application Example 4

Figure 12A:
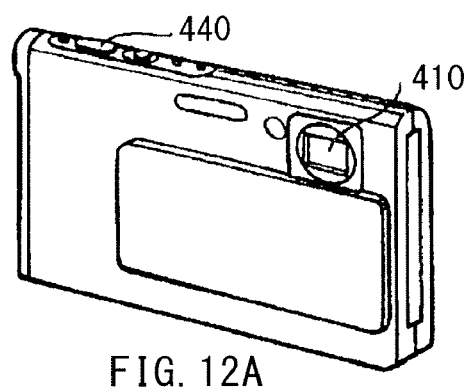
FIG. 12A is a perspective view illustrating an appearance of an application example 4 when viewed from front.
Figure 12B:
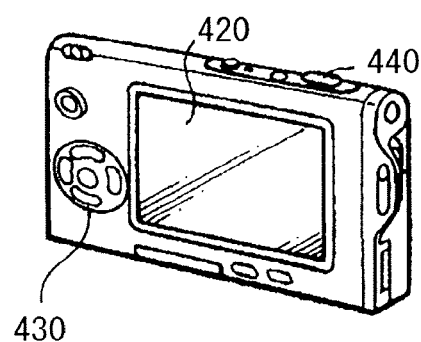
FIG. 12B is a perspective view illustrating an appearance of the application example 4 when viewed from back.

FIGS. 12A and 12B each illustrate an appearance of a digital camera. FIG. 12A illustrates a front face, and FIG. 12B illustrates a rear face. This digital camera may include, for example, a flash emitting section 410, a display section 420, a menu switch 430, and a shutter release 440. The display section 420 is configured using the display unit 1.

Application Example 5

Figure 13:
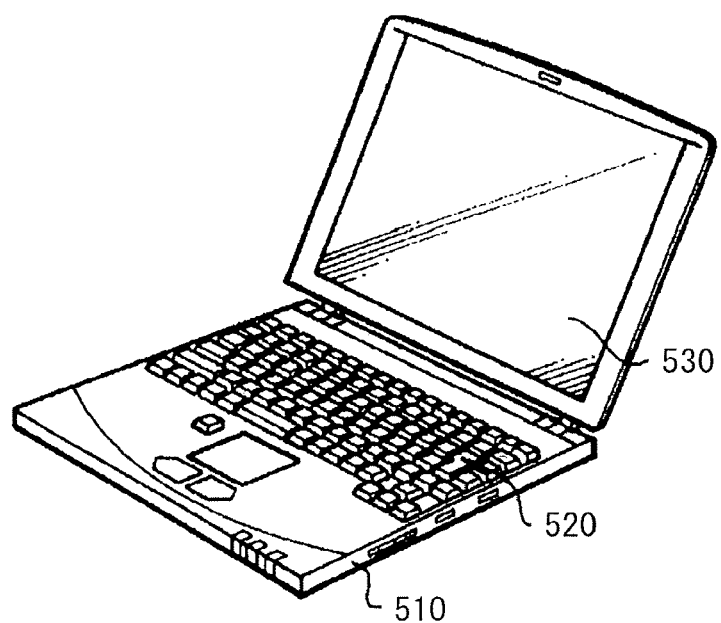
FIG. 13 is a perspective view illustrating an appearance of an application example 5.

FIG. 13 illustrates an appearance of a laptop computer. This laptop computer may include, for example, a main body section 510, a keyboard 520 provided to enter characters and the like, and a display section 530 displaying an image. The display section 530 is configured using the display unit 1.

Application Example 6

Figure 14:
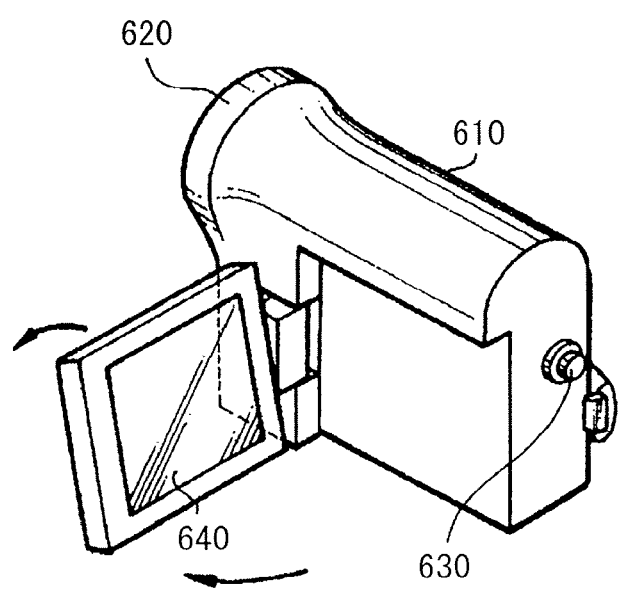
FIG. 14 is a perspective view illustrating an appearance of an application example 6.

FIG. 14 illustrates an appearance of a video camera. This video camera may include, for example, a main body section 610, a lens 620 disposed on a front face of the main body section 610 to shoot an image of a subject, a start/stop switch 630 used in shooting, and a display section 640. The display section 640 is configured using the display unit 1.

Application Example 7

Figure 15A:
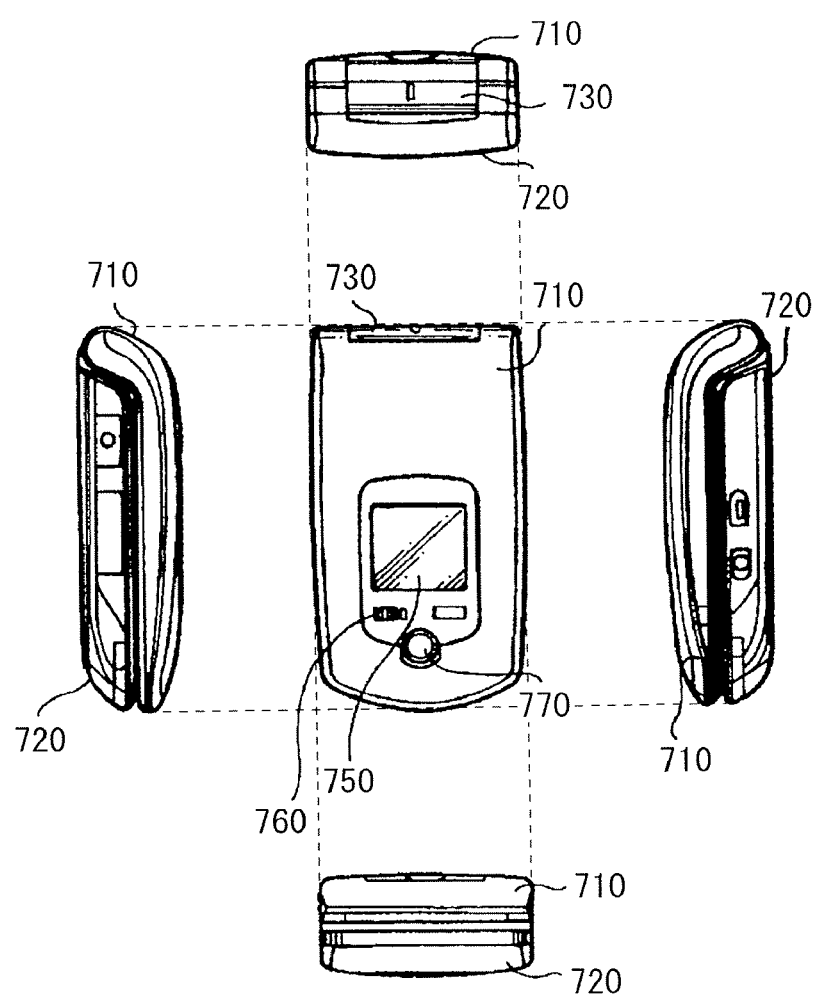
FIG. 15A is a diagram illustrating a front view, a left-side view, a right-side view, and a top view of an application example 7 in a closed state.
Figure 15B:
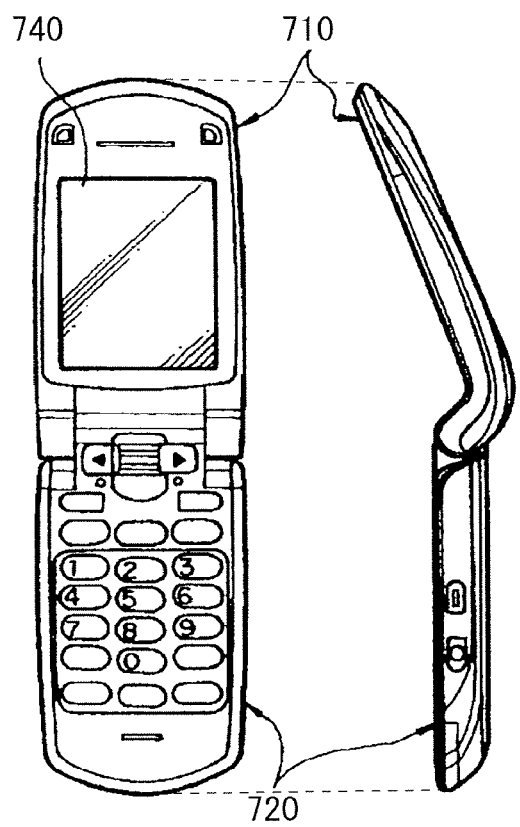
FIG. 15B is a diagram illustrating a front view and a side view of the application example 7 in an open state.

FIGS. 15A and 15B each illustrate appearances of a mobile phone. FIG. 15A illustrates a front face, a left side face, a right side face, a top face, and an undersurface of the mobile phone in a closed state. FIG. 15B illustrates a front face and a side face of the mobile phone in an open state. This mobile phone may be, for example, a unit in which an upper housing 710 and a lower housing 720 are connected by a coupling section (a hinge section) 730, and include a display 740, a sub-display 750, a picture light 760, and a camera 770. The display 740 or the sub-display 750 is configured using the display unit 1.

Example

Next, an Example of the present technology will be described.

Table 1 provides a comparison between contrast of an electrophoretic device (an experimental example 1) in which the porous layer was covered with the second fibrous structure and contrast of an electrophoretic device (an experimental example 2) configured without providing the second fibrous structure. Polyacrylonitrile was used for the first fibrous structure of each of the experimental examples 1 and 2, and for the second fibrous structure of the experimental example 2. A density of electrophoretic particles in an insulating liquid was 1.25% in both of the experimental examples 1 and 2. At the time of spinning, the first fibrous structure had a thickness of 26 µm (the experimental examples 1 and 2), and the second fibrous structure had a thickness of 5 µm.

TABLE 1

| Experimental Examples | Second Fibrous Structure | Optical Reflectance in Bright Display (%) | Optical Reflectance in Dark Display (%) | Contrast |
|---|---|---|---|---|
| 1 | Present | 49.5 | 2.39 | 20.7 |
| 2 | Absent | 51.1 | 4.3 | 11.9 |

As apparent from these results, by providing the second fibrous structure, the opening section is increased, and a region where the electrophoretic particles are freely movable by electrophoresis expands. In addition, the electrophoretic particles shield the porous layer effectively. In other words, the optical reflectance in dark display drops considerably (from 4.3% to 2.39%), thereby allowing the contrast to be improved.

The present technology has been described above with reference to some embodiment and Example, but is not limited thereto and may be variously modified. For example, the electrophoretic device according to an embodiment of the present technology may be applied to not only a display unit but other types of electronic apparatuses.

Further, the above-described embodiment and the like have been described with reference to the case in which the dark display is performed by the electrophoretic particles and the bright display is performed by the porous layer. However, the dark display may be performed by the porous layer and the bright display may be performed by the electrophoretic particles, as long as the width W1 is formable in the partition 34.

Furthermore, the above-described embodiment and the like have been described with reference to the case in which the top of the porous layer 33 is directly covered with the second fibrous structure 37. However, one or a plurality of structures may be arranged between the porous layer 33 and the second fibrous structure 37, as long as the second fibrous structure 37 is provided at a position closest to the display surface.

In addition, the case in which the pitch of the partitions 34 and that of the pixels do not agree with each other is illustrated in FIG. 1, but these may agree with each other.

Still further, the above-described embodiment and the like have been described with reference to the case in which the drive substrate 10 and the sealing layer 16 are fixed using the bonding layer 15 interposed therebetween. However, the sealing layer 16 may be directly fixed to the drive substrate 10.

In addition, the above-described embodiment and the like have been described with reference to the method of filling the insulating liquid 31, after the counter substrate 20 and the sealing layer 16 are disposed to face each other, but the display unit 1 may be manufactured by other method. For example, the counter substrate 20 may be disposed to face the sealing layer 16, after the insulating liquid 31 is applied to the counter substrate 20 on which the porous layer 33 is formed.

Furthermore, the technology encompasses any possible combination of some or all of the various embodiments described herein and incorporated herein.

It is possible to achieve at least the following configurations from the above-described example embodiments of the disclosure.

(1) An electrophoretic device, including:
- a porous layer including a first fibrous structure and a non-electrophoretic particle held in the first fibrous structure;
- an electrophoretic particle configured to move through a space formed at the porous layer;
- a second fibrous structure covering the porous layer; and
- a partition provided from the porous layer to the second fibrous structure.

(2) The electrophoretic device according to (1), wherein a width, in the second fibrous structure, of the partition is smaller than a width of a part of the partition in the porous layer, the part being closest to the second fibrous structure.

(3) The electrophoretic device according to (1) or (2), wherein a width, in the second fibrous structure, of the partition is smaller than a width, in the porous layer, of the partition.

(4) The electrophoretic device according to any one of (1) to (3), wherein the second fibrous structure is disposed between the first fibrous structure and a display surface.

(5) The electrophoretic device according to any one of (1) to (4), wherein the non-electrophoretic particle has optical reflectance that is higher than optical reflectance of the electrophoretic particle.

(6) The electrophoretic device according to any one of (1) to (5), wherein the partition includes a photocurable resin.

(7) The electrophoretic device according to any one of (1) to (6), wherein the partition includes a narrowed section in the porous layer.

(8) The electrophoretic device according to any one of (1) to (7), wherein
- the porous layer, the electrophoretic particle, the second fibrous structure, and the partition are provided in an insulating liquid, and
- a difference between a refractive index of the insulating liquid and a refractive index of the second fibrous structure is smaller than a difference between the refractive index of the insulating liquid and a refractive index of the porous layer.

(9) The electrophoretic device according to any one of (1) to (8), wherein the partition includes a light transmissive material, and incorporates a part of the porous layer.

(10) An electrophoretic device, including:
- a porous layer including a fibrous structure and a non-electrophoretic particle held in the fibrous structure;
- an electrophoretic particle configured to move through a space formed at the porous layer; and
- a partition provided from inside of the porous layer to outside of the porous layer, wherein a width of a part of the partition, the part being on the outside of the porous layer, is smaller than a width of a part of the partition in the porous layer, the part being closest to the outside.

(11) A display unit provided with an electrophoretic device, the electrophoretic device including:
- a porous layer including a first fibrous structure and a non-electrophoretic particle held in the first fibrous structure;
- an electrophoretic particle configured to move through a space formed at the porous layer;
- a second fibrous structure covering the porous layer; and
- a partition provided from the porous layer to the second fibrous structure.

(12) A display unit provided with an electrophoretic device, the electrophoretic device including:
- a porous layer including a fibrous structure and a non-electrophoretic particle held in the fibrous structure;
- an electrophoretic particle configured to move through a space formed at the porous layer; and
- a partition provided from inside of the porous layer to outside of the porous layer, wherein a width of a part of the partition, the part being on the outside of the porous layer, is smaller than a width of a part of the partition in the porous layer, the part being closest to the outside.

(13) An electronic apparatus with a display unit, the display unit being provided with an electrophoretic device, the electrophoretic device including:
- a porous layer including a first fibrous structure and a non-electrophoretic particle held in the first fibrous structure;
- an electrophoretic particle configured to move through a space formed at the porous layer;
- a second fibrous structure covering the porous layer; and
- a partition provided from the porous layer to the second fibrous structure.

(14) An electronic apparatus with a display unit, the display unit being provided with an electrophoretic device, the electrophoretic device including:
- a porous layer including a fibrous structure and a non-electrophoretic particle held in the fibrous structure;
- an electrophoretic particle configured to move through a space formed at the porous layer; and
- a partition provided from inside of the porous layer to outside of the porous layer, wherein a width of a part of the partition, the part being on the outside of the porous layer, is smaller than a width of a part of the partition in the porous layer, the part being closest to the outside.

It should be understood by those skilled in the art that various modifications, combinations, sub-combinations, and alterations may occur depending on design requirements and other factors insofar as they are within the scope of the appended claims or the equivalents thereof.

The invention claimed is:

1. An electrophoretic device, comprising:
- a porous layer configured to have a first fibrous structure that includes a non-electrophoretic particle and an electrophoretic particle; and
- a second fibrous structure configured to cover the porous layer,
wherein
- a first width, in the second fibrous structure, of a partition is smaller than a second width of a first part of the partition in the porous layer, wherein the first part is closest to the second fibrous structure,
- the porous layer, the electrophoretic particle, the second fibrous structure, and the partition are in an insulating liquid, and
- a first difference between a first refractive index of the insulating liquid and a second refractive index of the second fibrous structure is smaller than a second difference between the first refractive index of the insulating liquid and a third refractive index of the porous layer.

2. The electrophoretic device according to claim 1, wherein the first width, in the second fibrous structure, of the partition is smaller than the second width, in the porous layer, of the partition.

3. The electrophoretic device according to claim 1, wherein the second fibrous structure is between the first fibrous structure and a display surface.

4. The electrophoretic device according to claim 1, wherein the non-electrophoretic particle has a first optical reflectance that is higher than a second optical reflectance of the electrophoretic particle.

5. The electrophoretic device according to claim 1, wherein the partition includes a photocurable resin.

6. The electrophoretic device according to claim 5, wherein the partition includes a narrowed section in the porous layer.

7. The electrophoretic device according to claim 1, wherein the partition includes a light transmissive material, and wherein the partition incorporates a second part of the porous layer.

8. A display unit, comprising:
an electrophoretic device, comprising:
a porous layer configured to have a first fibrous structure that includes a non-electrophoretic particle and an electrophoretic particle; and
a second fibrous structure configured to cover the porous layer,
wherein
a first width, in the second fibrous structure, of a partition is smaller than a second width of a first part of the partition in the porous layer, wherein the first part is closest to the second fibrous structure,
the porous layer, the electrophoretic particle, the second fibrous structure, and the partition are in an insulating liquid, and
a first difference between a first refractive index of the insulating liquid and a second refractive index of the second fibrous structure is smaller than a second difference between the first refractive index of the insulating liquid and a third refractive index of the porous layer.

9. The display unit according to claim 8, wherein the first width, in the second fibrous structure, of the partition is smaller than the second width, in the porous layer, of the partition.

10. The display unit according to claim 8, wherein the second fibrous structure is between the first fibrous structure and a display surface.

11. The display unit according to claim 8, wherein the non-electrophoretic particle has a first optical reflectance that is higher than a second optical reflectance of the electrophoretic particle.

12. The display unit according to claim 8, wherein the partition includes a photocurable resin.

13. The display unit according to claim 12, wherein the partition includes a narrowed section in the porous layer.

14. The display unit according to claim 8, wherein the partition includes a light transmissive material, and wherein the partition incorporates a second part of the porous layer.

* * * * *